United States Patent
Fogg et al.

[19]

[11] Patent Number: 5,841,839
[45] Date of Patent: Nov. 24, 1998

[54] INTEGRATED TELEPHONE SWITCHING APPARATUS FOR FULLY INTEGRATING MULTIPLE BUSINESS TELEPHONE SYSTEMS WITH A SINGLE VOICE MAIL SYSTEM

[76] Inventors: Shawn D. T. Fogg; David C. Fogg; Pamela Tripode Fogg, all of 250 Stone Ridge Dr., East Greenwich, R.I. 02818

[21] Appl. No.: 761,356

[22] Filed: Dec. 6, 1996

[51] Int. Cl.$^6$ ........................................... H04M 1/64
[52] U.S. Cl. ............................................. 379/88; 379/225
[58] Field of Search .................................. 379/67, 88, 89, 379/201, 210, 211, 212, 213, 225

[56] References Cited

U.S. PATENT DOCUMENTS

| | | |
|---|---|---|
| 4,371,752 | 2/1983 | Matthews et al. . |
| 4,484,031 | 11/1984 | Gray et al. . |
| 4,580,012 | 4/1986 | Matthews et al. . |
| 4,696,028 | 9/1987 | Morganstein et al. . |
| 4,747,124 | 5/1988 | Ladd . |
| 4,757,267 | 7/1988 | Riskin . |
| 4,763,353 | 8/1988 | Canale et al. . |
| 4,766,604 | 8/1988 | Axberg . |
| 4,792,967 | 12/1988 | Ladd et al. . |
| 4,809,321 | 2/1989 | Morganstein et al. . |
| 4,926,462 | 5/1990 | Ladd et al. . |
| 5,029,199 | 7/1991 | Jones et al. . |
| 5,255,314 | 10/1993 | Applegate et al. ............... 379/88 |
| 5,260,990 | 11/1993 | MeLampy et al. . |
| 5,394,460 | 2/1995 | Olson et al. . |
| 5,450,475 | 9/1995 | Miyagaki . |
| 5,450,488 | 9/1995 | Pugaczewski et al. . |
| 5,471,523 | 11/1995 | Smith et al. . |
| 5,475,737 | 12/1995 | Garner et al. . |
| 5,515,422 | 5/1996 | MeLampy et al. . |
| 5,708,699 | 1/1998 | Concepcion et al. ............. 379/89 |

FOREIGN PATENT DOCUMENTS

| | | |
|---|---|---|
| 0 215 309 | 3/1987 | European Pat. Off. . |
| 60-41358 | 3/1985 | Japan . |
| 61-29250 | 2/1986 | Japan . |

OTHER PUBLICATIONS

Patrick Miller, Intelligent Network/2: A flexible framework for exchange services, May/Jun. 1987, Bell Communications Research Exchange, vol. 3, Issue 3, 5 pages.

Jim Cottrill and Jon Grushka, Siemens SATURN EPBXs–Systems for Tomorrow's Needs, Sep./Oct. 1987, Private Communication Systems, telecom report 10 (1987) No. 5, 6 pages.

Octel Communications Corporation, Data Sheet—Aspen Voice Message Systems PBX Integration Device, Jan. 1989, Octel Communications Corporation, 2 pages.

(List continued on next page.)

*Primary Examiner*—Fan S. Tsang
*Attorney, Agent, or Firm*—Barlow, Josephs & Holmes, Ltd.

[57] ABSTRACT

An integrated telephone switching apparatus is operative for interconnecting a plurality a PBX's to a single voice mail system. The integrated switching apparatus includes a plurality of input ports for accepting calls from the voice mail extensions of different PBX's, a plurality of output ports for directing the calls to a the voice ports of a voice mail system, and a switching circuit for switching the calls from input ports to the output ports. The switching apparatus further includes a switching control system for controlling the switching of the incoming calls from the input ports to the output ports. The control system receives call information from the PBX's via a digital data connection, or by DTMF means, matches each set of call information with an associated call, creates a new set of call information for each of the calls when each of the calls is switched from one of the input ports to one of the output port, and supplies the new set of call information to the voice mail system when the call is switched so that the voice mail system can answer the call and play the required greeting. The key operating feature of the switching control system is the fact that all of the voice mail ports are dynamically allocated during use. By dynamically allocating the voice mail ports, the number of voice mail ports can be reduced to about half the number of incoming voice mail extensions.

22 Claims, 10 Drawing Sheets

OTHER PUBLICATIONS

Octel Communications Corporation, Data Sheet—Aspen/Branch Voice Message Systems Integrated with the ROLM PBX, 1985, Octel Communications Corporation, 2 pages.

Octel Communications Corporation, Data Sheet—Aspen/Branch Voice Message Systems Integrated with the Mitel PBX, Jan. 1985, Octel Communications Corporation, 2 pages.

IBM, ROLM Phone Mail Integration for Meridian SL–1 PBX Systems, Sep. 1987, IBM Corp. Programming Announcement, 2 pages.

The Yankee Group, Rolm's Phonemail—New and Improved, Mar. 1987, The Yankee Group—Product Watch, 5 pages.

AT&T Information Systems, AT&T System 85 Audix: Audio Information Exchange, 6 pages.

Genesis Electronics Corporation, Specifications for Cindi III Voice Mail, Operating of the Vista Voice Information System, 1987, 6 pages.

Octel Communications Corporation, Voice Messaging Integrated with PBX and Centres, Apr. 1988, Octel: Voice Processing System Integration Background Information, 5 pages.

INTEGRATED TELEPHONE SWITCHING APPARATUS FOR FULLY INTEGRATING MULTIPLE BUSINESS TELEPHONE SYSTEMS WITH A SINGLE VOICE MAIL SYSTEM

BACKGROUND OF THE INVENTION

The instant invention relates generally to telephone exchange systems and telephone voice mail systems, and in particular to an integrated telephone switching apparatus which allows multiple remote and/or local telephone exchange systems, such as private branch exchanges (PBX), key systems, central office switches, and CENTREX systems, to be connected to a single voice mail system with full integration of all telephone exchange systems from all locations.

Telephone exchange systems provide organizations with the ability link a plurality of incoming trunk lines with a plurality of telephone extensions at the organizations premises. As indicated above, there are many different types of telephone exchange systems, including private branch exchanges (PBX's), key systems, central office switching systems, and CENTREX systems which can provide switching capabilities. Numerous PBX systems, key systems, central office switching systems, and CENTREX systems are well known and commercially available from a variety of different vendors. In order to provide continuity within the rest of this specification and the claims, the term PBX will hereinafter be utilized as a generic term to describe a generic telephone exchange system, and it is to be understood that the term PBX is intended to include private branch exchanges as well as key systems, central office switches, CENTREX systems, and other types of telephone exchange systems.

Integration of voice mail systems with PBX systems, key systems, etc. is well known in the art. Integration between a PBX and a voice mail system can generally be defined as the ability to automatically exchange call information between the PBX and voice mail system without user input. More specifically, this exchange of information includes providing the identity of the called party so that the voice mail system can select the proper personal greeting (called party ID), return to operator (dial O), providing message waiting indicator information back to the PBX (MWI), direct call message retrieval (calling party ID), direct reply to messages left by internal callers, and original called party ID on multiple call forward. In out-of-band integration systems call information from the PBX is provided to the voice mail system by a digital connection between the PBX and the voice mail system. Likewise MWI information flows from the voice mail system back to the PBX through the digital connection. In in-band systems, data is provided to the voice mail system by DTMF tones forwarded with the transferred call. MWI information flows back to an in-band PBX by picking up a predefined extension and dialing a set of DTMF tones back to the PBX. The PBX interprets these tones to light an MWI on the called party extension. In a typical office telephone exchange system arrangement, the office PBX is directly connected to an associated voice mail system wherein the voice mail system provides voice mail functions for that particular PBX. This is an effective arrangement when a company has only one office with one PBX. However, when a company has more than one location, either locally or remotely, each office PBX is usually provided with an associated voice mail system to serve that particular PBX. In order for the separate voice mail systems to communicate, i.e. to exchange messages, voice messages destined for a remote location are stored in a storage device, such as a hard drive, and at a predetermined time, for example once each hour, the voice mail system will connect with the remote voice mail system and transfer the messages. Although the conventional arrangement of providing separate voice mail systems for each PBX functions effectively, there are many obvious disadvantages to such an arrangement.

The first obvious disadvantage is the cost of providing separate voice mail systems for each location. These costs can be broken down into equipment, service, maintenance, management, and connection costs. With regard to equipment, each separate voice mail system is expensive, and accordingly, the costs for providing each location with its own dedicated voice mail system can run into hundreds of thousands of dollars for a company with four or more offices. Included in the initial equipment expenditures is the cost of purchasing multiple power systems to provide both redundant power and back-up power to the voice mail systems in the event of power equipment failure or power outages. Further adding the equipment costs is the cost of spare parts which are usually maintained at each separate site to effect quick repairs in the event of a system failure. Still further adding the already high cost of separate systems is the fact that each separate system must be oversized to accommodate peak usage at that particular location. Accordingly, each location is provided with more storage space and more accessible voice ports than is necessary if the system were fully integrated. With regard to service and interconnection costs, each location carries maintenance costs, service contracts, the costs of maintaining local system administrators to run the separate systems, and inter-system interconnection charges to exchange messages between locations.

Another obvious disadvantages is that voice mail messages bound for off-site locations are not immediately available to the person receiving the message. As indicated above, these message may be parked in a storage device for an hour or more before they are transferred to the remote voice mail system.

SUMMARY OF THE INVENTION

The instant invention provides an integrated telephone switching apparatus which is operative for interconnecting a plurality a private branch exchanges, and/or key systems, and/or central office switches, and/or CENTREX systems (hereinafter PBX's) to a single voice mail system regardless of manufacturer, or location, or communications protocol. In general, the switching apparatus provides a unique switching arrangement for accepting incoming calls and call information from a plurality of voice mail extensions of a plurality of different PBX's, and for performing cross-connection of all of those calls to a single voice mail system.

More specifically, the integrated switching apparatus includes a plurality of input ports for accepting calls from the voice mail extensions of different PBX's, a plurality of output ports for directing the calls to a plurality of voice ports of a voice mail system, and a switching circuit for switching the calls from input ports to the output ports. Voice mail extensions can be connected to the integrated switching apparatus by a variety of different means, including but not limited to voice over data multiplexors for remote PBX's, direct connection for local (on premise) PBX's, and off premise extensions (OPX's) for local (off-site) PBX's. The switching apparatus further includes a switching control system for controlling the switching of the incoming calls from the input ports to the output ports. The switching control system receives call information from the different PBX's, either via a separate digital data connection or by DTMF means, matches each set of call information with an associated call, creates a new set of call information for each of the calls when each of the calls is switched from one of the input ports to one of the output ports, and supplies the new set of call information to the voice mail system when the call is switched so that the voice mail system can answer the call and play the required greeting. The key operating feature of the switching control system is the fact that all of the voice mail ports are dynamically allocated during use. In other words, each voice mail port is selected in rotating sequence during operation, rather than having a predetermined order of preference. By dynamically allocating the voice mail ports, the number of voice mail ports can be reduced to about half the number of incoming voice mail extensions. This is a dramatic reduction in the number of voice mail ports over the one to one allocation system used in the prior art systems, and substantially reduces the overall cost of purchase and maintenance during operation. Still further, the switching control system recognizes different call protocols, including SMDI and various DTMF formats, and automatically creates a new call information data packet in a predetermined protocol for each call for use by the voice mail system.

Accordingly, it is a primary object of the instant invention to: provide an integrated telephone switching apparatus which enables multiple PBX's to be connected to a single voice mail system; the provision of an integrated telephone switching apparatus wherein the number of voice mail ports is about half of the incoming voice mail extensions; the provision of an integrated telephone switching apparatus having a switching control system that dynamically allocates the voice mail ports during operation; and the provision of an integrated telephone switching apparatus having a switching control system that recognizes and receives a plurality of different call information protocols, and which creates a new call information data packet in a predetermined protocol.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
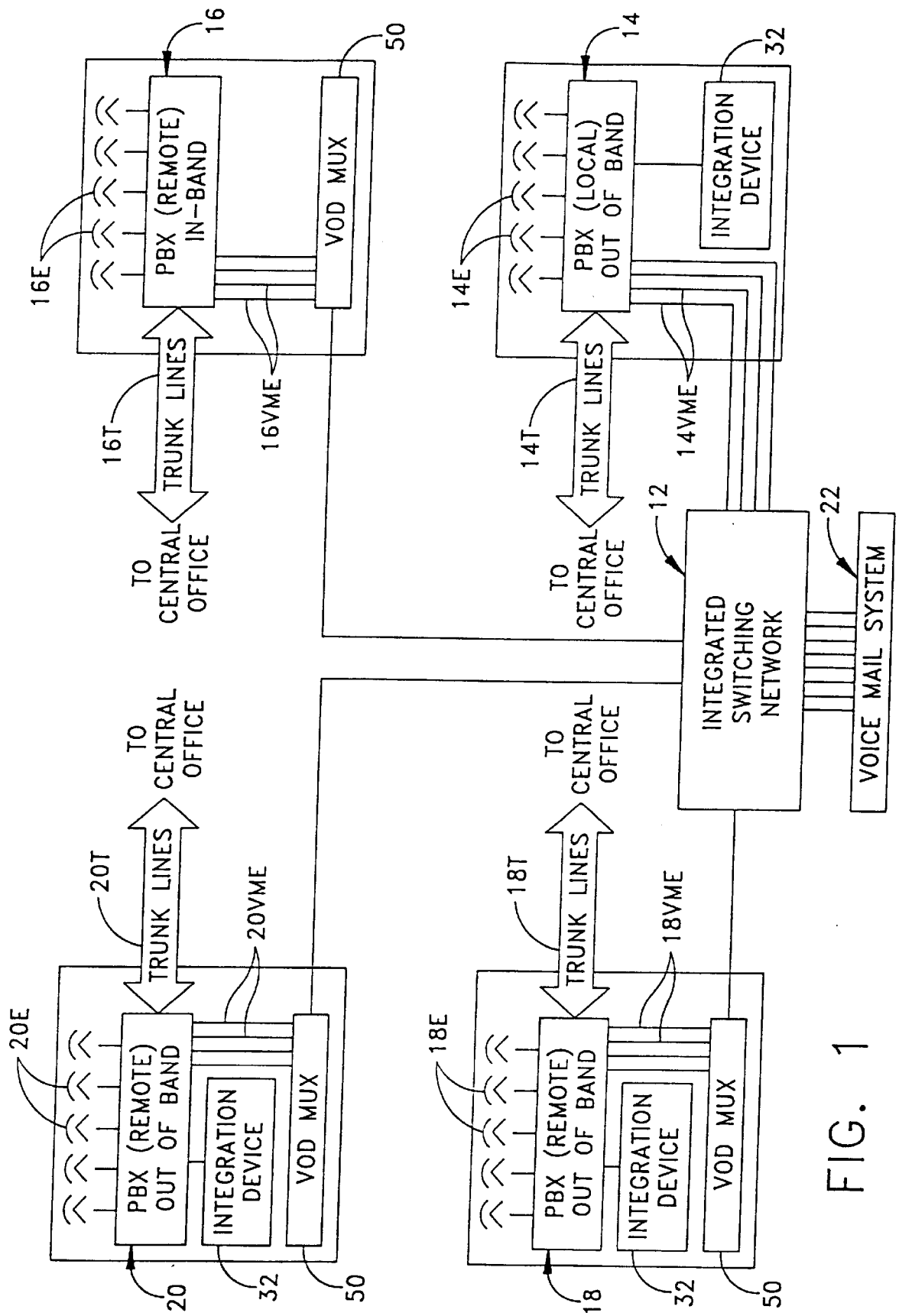
FIG. 1 is a schematic block diagram of an integrated telephone system incorporating the switching apparatus of the instant invention.
Figure 1A:
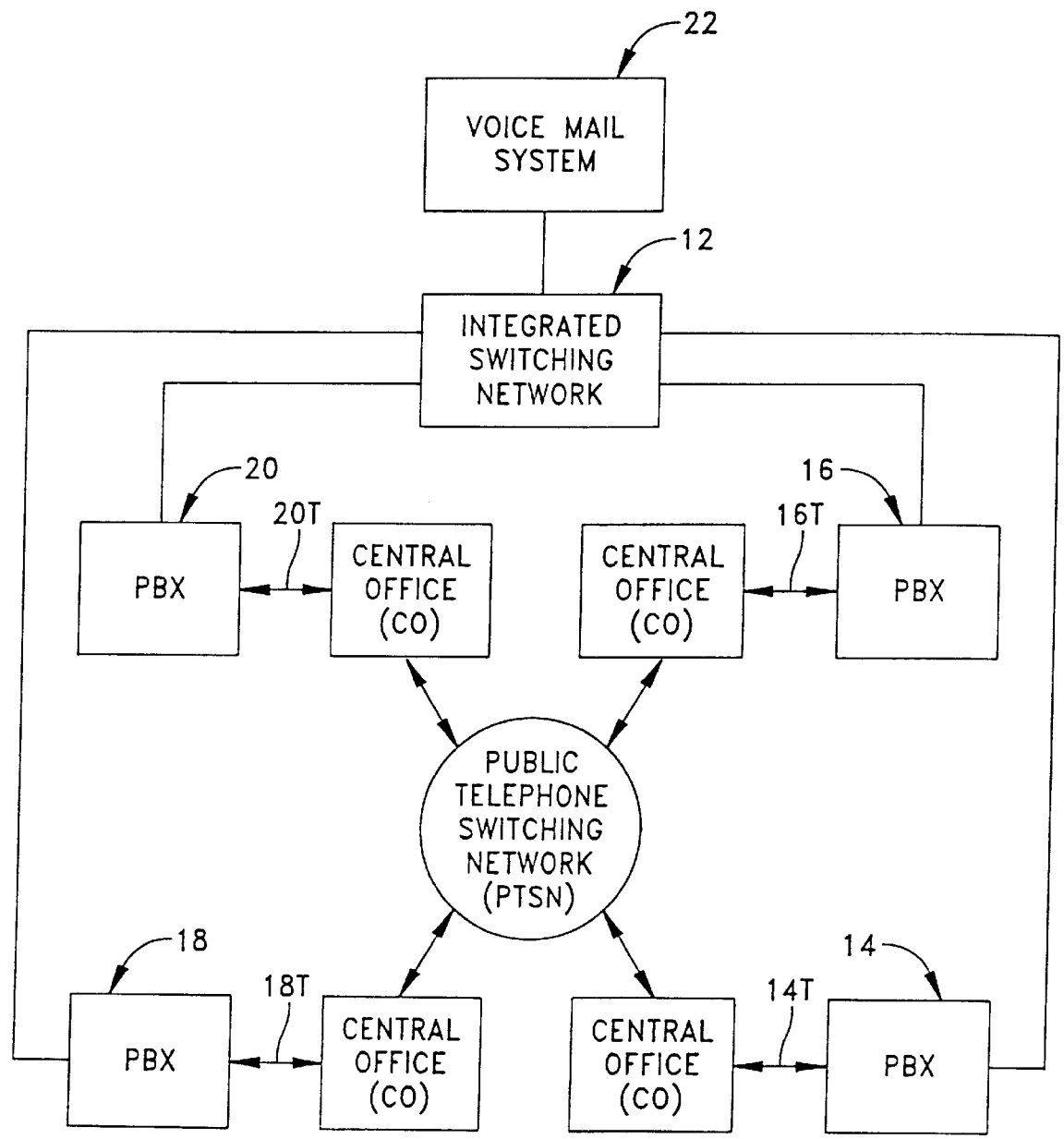
FIG. 1A is a schematic block diagram of the location of the integrated telephone switching network relative to the public telephone switching networks and the central offices.

Referring now to the drawings, an integrated telephone switching and voice mail network incorporating the integrated switching apparatus of the instant invention is illustrated and generally indicated at 10 in FIG. 1, while the integrated switching apparatus of the instant invention is generally indicated at 12 in the drawings. As will hereinafter be more fully described, the apparatus 12 is generally operative for interconnecting a plurality a private branch exchanges (PBX's) generally indicated at 14, 16,18, and 20 respectively, to a single voice mail system generally indicated at 22.

As indicated in the Background portion of this specification, the term PBX is intended to generally define a discrete telephone exchange system, including, but not limited to private branch exchanges, key systems, central office switching systems, and CENTREX systems, each of which serves a separate office. For example, a PBX 14 serving a Boston, MA office, a PBX 16 serving a Chicago, Ill., office, a PBX 18 serving a Providence, RI office, and a PBX 20 serving a Denver office. Each PBX 14, 16, 18, 20 includes a plurality of incoming trunk lines 14T, 16T, 18T, and 20T respectively, which connect the respective PBX with an associated central office and in turn to a public or private telephone network (PSTN). Each PBX further includes multiple telephone extensions 14E, 16E, 18E, and 20E respectively, at the location premises. Each PBX is utilized in connection with the voice mail system 22, and therefore each PBX further includes voice mail extensions 14VME, 16VME, 18VME, and 20VME respectively, to forward calls the integrated switching apparatus 12 which in turn connects to the voice mail ports of the voice mail system 22. The PBX's 14,16,18, and 20 generally provide the functions of switching calls from the incoming trunk lines 14T, 16T, 18T, and 20T to the telephone extensions 14E, 16E, 18E, and 20E, and switching calls from extension to extension or from extension to outgoing trunk line. Many types of PBX's also include what are known as digital telephone extension which is utilized to provide call information via an integration device to a voice mail system, attendant telephone, or for other purposes.

Figure 3:
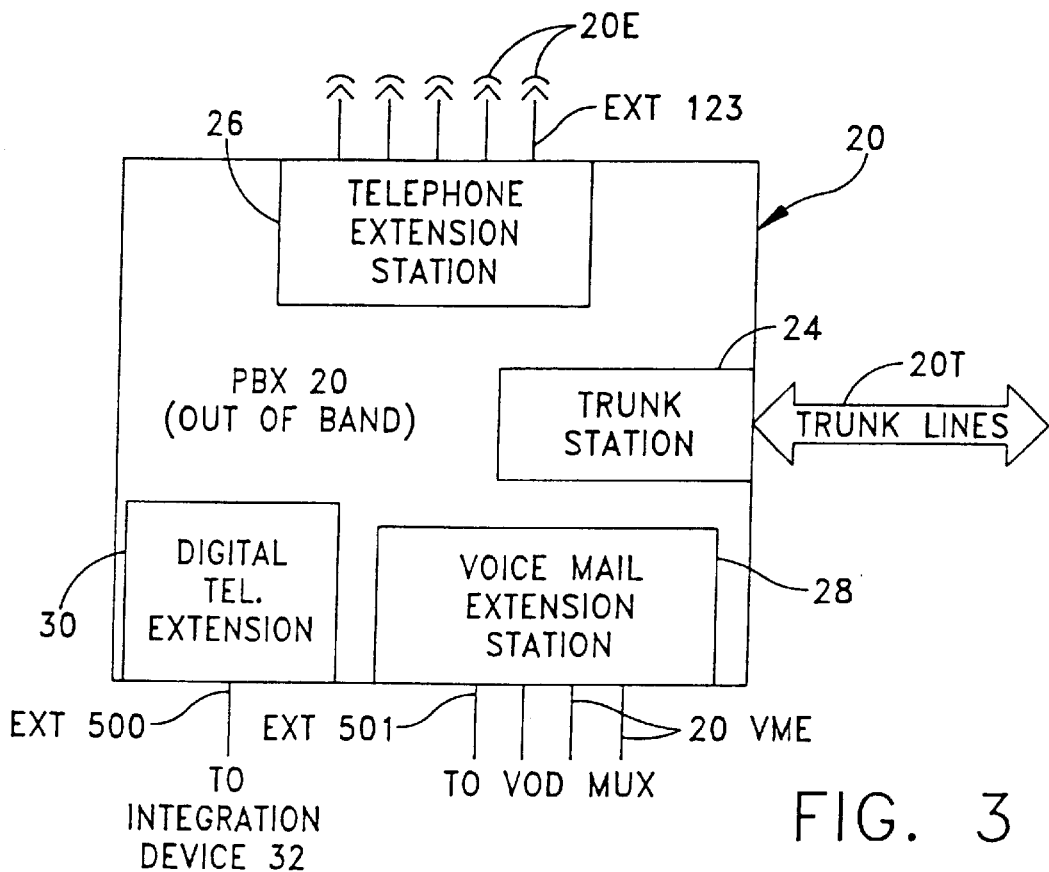
FIG. 3 is an enlarged block diagram of an out-of-band PBX as utilized within the integrated telephone network shown in FIG. 1.

Referring to FIG. 3, a more detailed configuration of PBX 20 is illustrated. PBX 20 comprises an out-of-band PBX which 20 includes a trunk station 24 for trunk lines 20T, a first telephone extension station 26 for the plurality of telephone extensions 20E, a second telephone extension station 28 for the voice mail extensions 20VME, and a digital telephone extension 30. As will be described hereinbelow, the digital telephone extension is connected to an integration device 32, such as a VoiceBridge Series II integration module, as manufactured by Voice Technologies Group, Buffalo, N.Y., to provide call information for out-of-band call integration with the switching apparatus 12. It is noted that PBX 14 and PBX 18 also include a digital telephone extension, and integration devices 32 although they are not specifically illustrated herein. The VoiceBridge device may extract call information, such as calling party, called party extension number, ring no answer codes, busy codes, etc., from the respective PBX and provides an SMDI data stream to identify the call to a voice mail system for use in processing the call through the voice mail system. While the VoiceBridge SMDI call protocol is indicated as the preferred arrangement for the described system, it is to be understood that the present arrangement can be adapted to deal with other call protocols and provide the same level of effectiveness.

Figure 4:
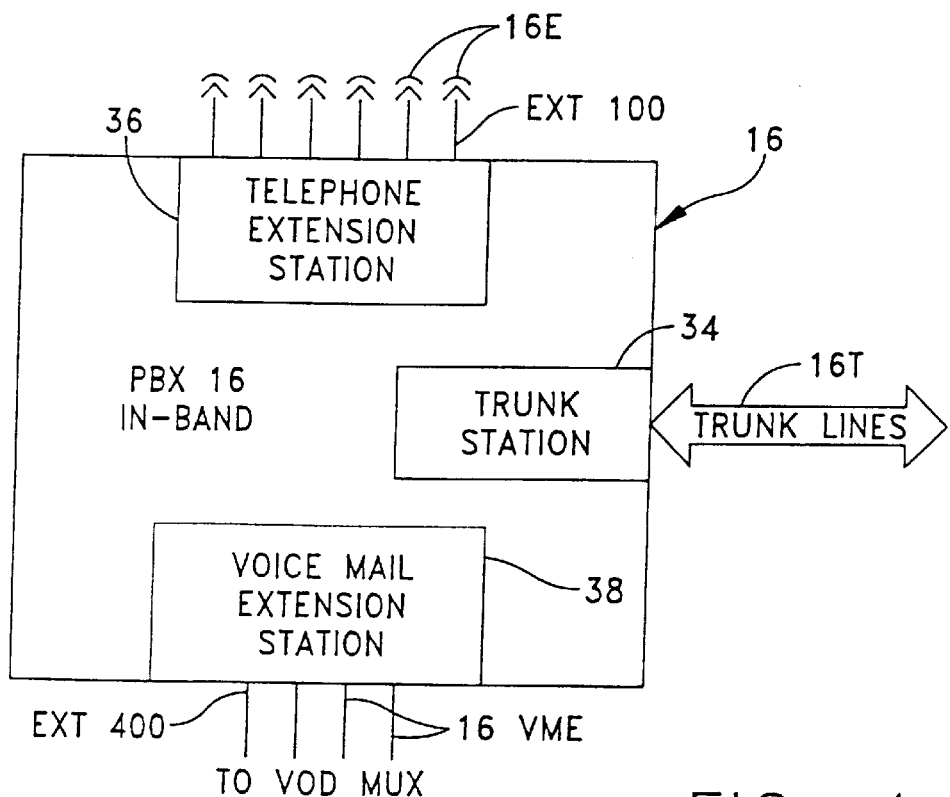
FIG. 4 is an enlarged block diagram of an in-band PBX as utilized within the integrated telephone network shown in FIG. 1.

Referring to FIG. 4, the detailed configuration of PBX 16 of the instant system is illustrated. PBX 16 includes a trunk station 34 for trunk lines 16T, a first telephone extension station 36 for interfacing with telephone extensions 16E, and a second telephone extension station 38 for voice mail extensions 16VME. Notably missing from PBX 16 is the digital telephone extension. PBX 16 communicates with the integrated switching apparatus 12 in what is commonly referred to a in-band integration mode wherein call information is provided by DTMF tones generated by PBX 16 and attached to the call signal when output through the voice mail extension 16VME.

The voice mail system 22 comprises a conventional out-of-band voice mail system well known to those skilled in the art. While an out-of-band voice mail system is described herein, the present system could be equally effective using an in-band voice mail system. The voice mail system functions in a completely normal manner and simply views the switching apparatus 12 as a PBX using all out-of-band signalling protocols.

Figure 2:
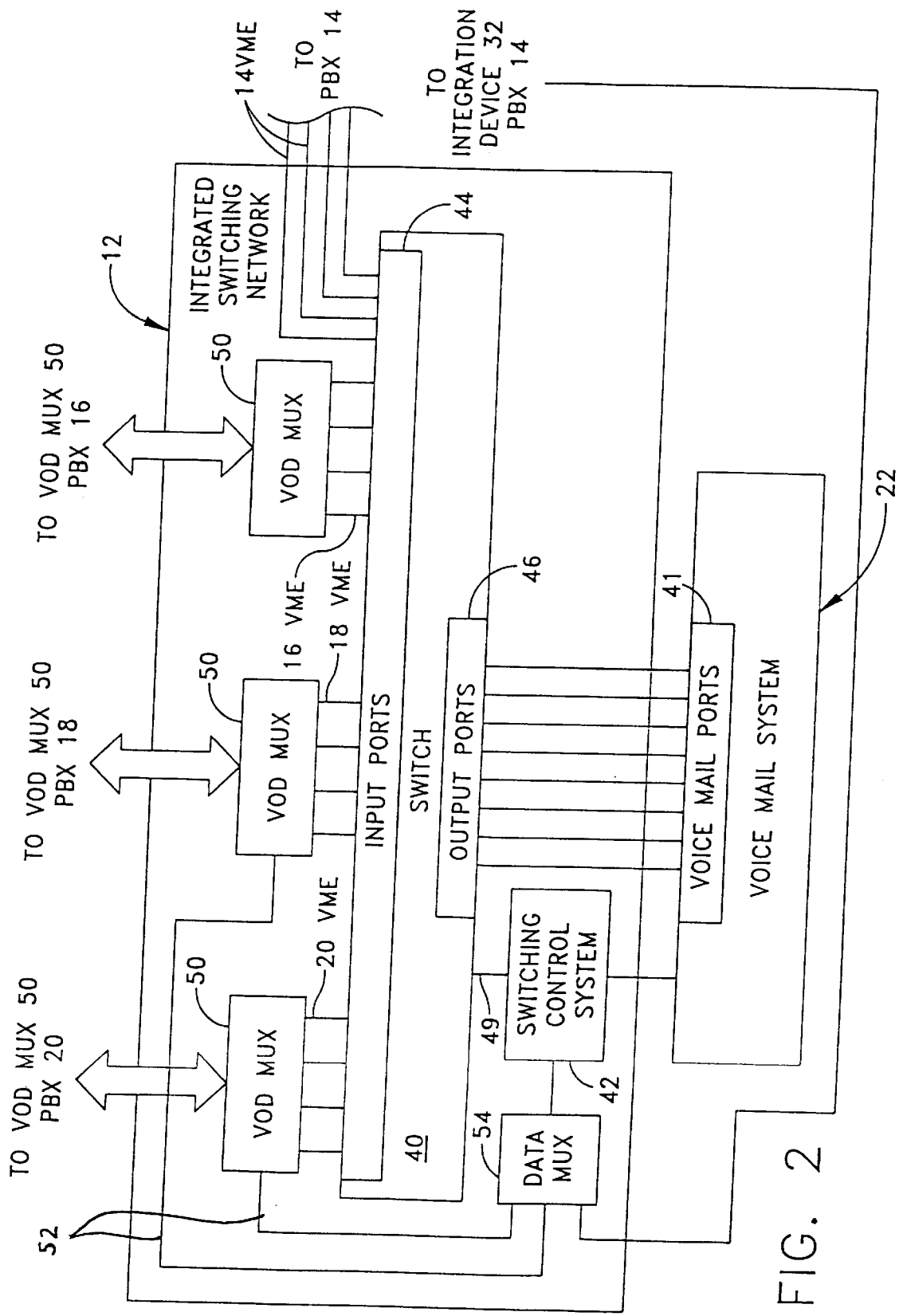
FIG. 2 is an enlarged block diagram of the integrated switching apparatus of the instant invention.
Figure 5:
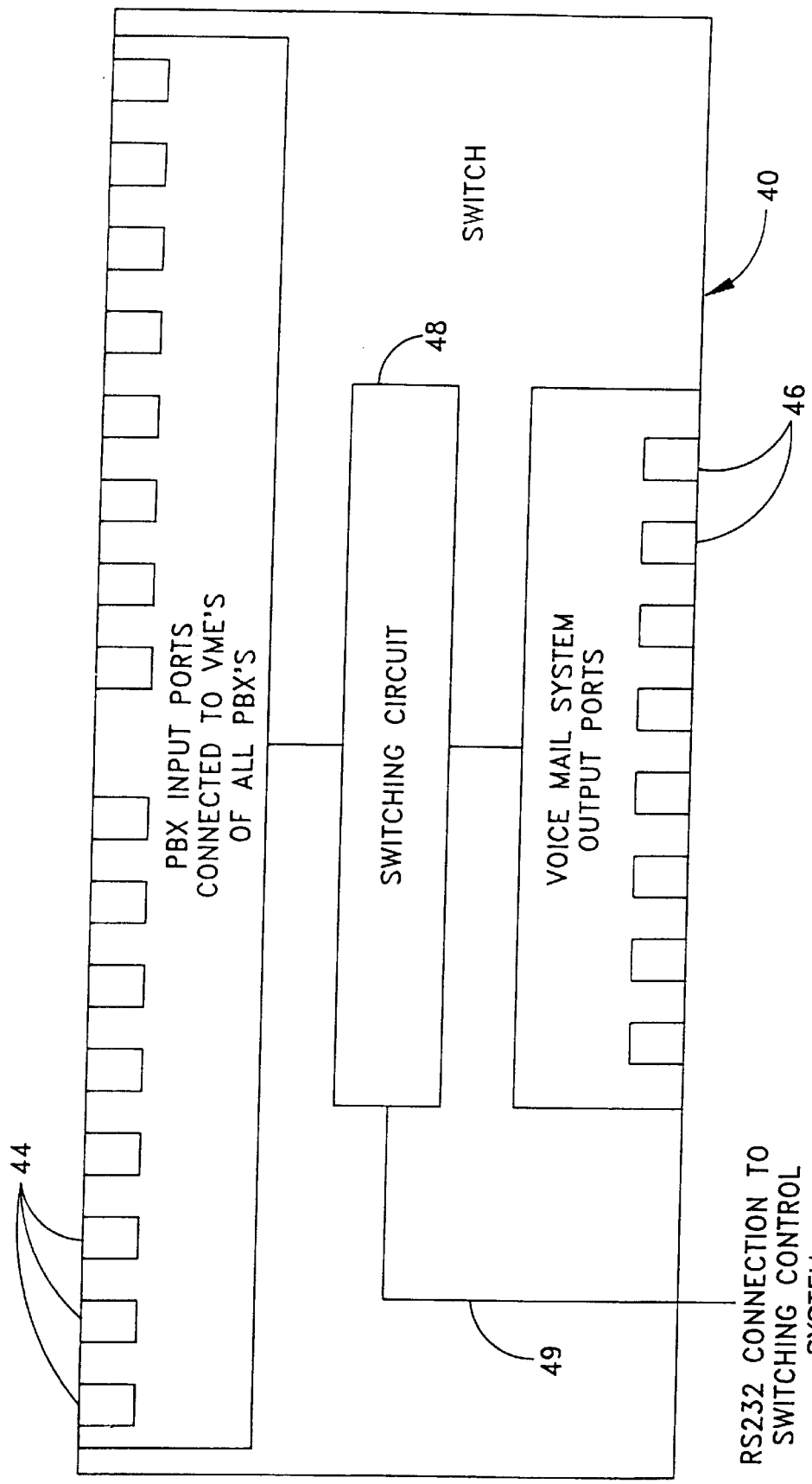
FIG. 5 is an enlarged block diagram of the switching device of the instant invention.

Turning now to FIGS. 2 and 5, the apparatus 12 includes a switching assembly generally indicated at 40 which is operative for interconnecting the voice mail extensions 14VME, 16VME, 18VME and 20VME to the voice mail ports 41 of the voice mail system 22, and further includes a switching control system 42 (host computer) for controlling cross-connection of the calls from voice mail extensions 14VME, 16VME, 18VME and 20VME to the voice mail ports 41 of the voice mail system 22. More specifically, the switching assembly 40 comprises a plurality of input ports 44 for receiving connections from the various voice mail extensions 14VME, 16VME, 18VME, AND 20VME, a plurality of output ports 46 for directing the calls to the voice mail ports 41 of the voice mail system 22, and a switching circuit 48 for cross-connecting calls from the input ports 44 to the output ports 46. There are approximately twice as many input ports 44 as output ports 46. The significance of the two-to-one ratio will be described in a later portion of the specification. The switching control system 42 is connected to the switch circuit 48 by an RS232 connection 49 for controlling cross-connection of the calls from the input ports 44 to the output ports 46, as well as the voice mail system 22 to provide an exchange of out-of-band call information. The switching control system 42 preferably interacts and exchanges information with the voice mail 22 system using an SMDI protocol. However, communication between the switching apparatus 40 and the voice mail system 22 may be accomplished in any of a variety of protocols.

In describing the overall configuration of the present integrated telephone and voice mail system 10, it is noted that PBX 14, integrated switching apparatus 12, and voice mail system, 22 are all located at a common facility. In this regard, the voice mail extensions 14VME of PBX 14 are directly coupled to the input 44 ports of the switching apparatus 40 on a one-to-one correspondence. In contrast, PBX 16, PBX 18 and PBX 20 are located at remote locations, and accordingly, the voice mail extensions 16VME, 18VME, and 20VME, as well as the digital data line from the integration devices 32 (PBX 18 and PBX 20), are coupled to the apparatus 12 through voice over data multiplexors 50, one of which is located at the remote location, and the other of which is located at the apparatus 12 (See. FIG. 2). PBX 16 is an in-band PBX and does not include an integration device. It is also contemplated that other voice over data communication technologies, such as frame relay, or TCP/IP (Transmission Control Protocol/Internet Protocol) could be utilized to provide the same functionality. When the multiplexed data streams enter the apparatus 12, they are separated out into the different extensions, and into their associated digital data streams. The multiple outgoing digital data lines 52 are then multiplexed into a single data stream in a data multiplexor 54 and fed directly into the switching control system 42 for processing. The data line from integration device 32 of PBX 14 is also connected directly into the data mux 54.

Figure 6:
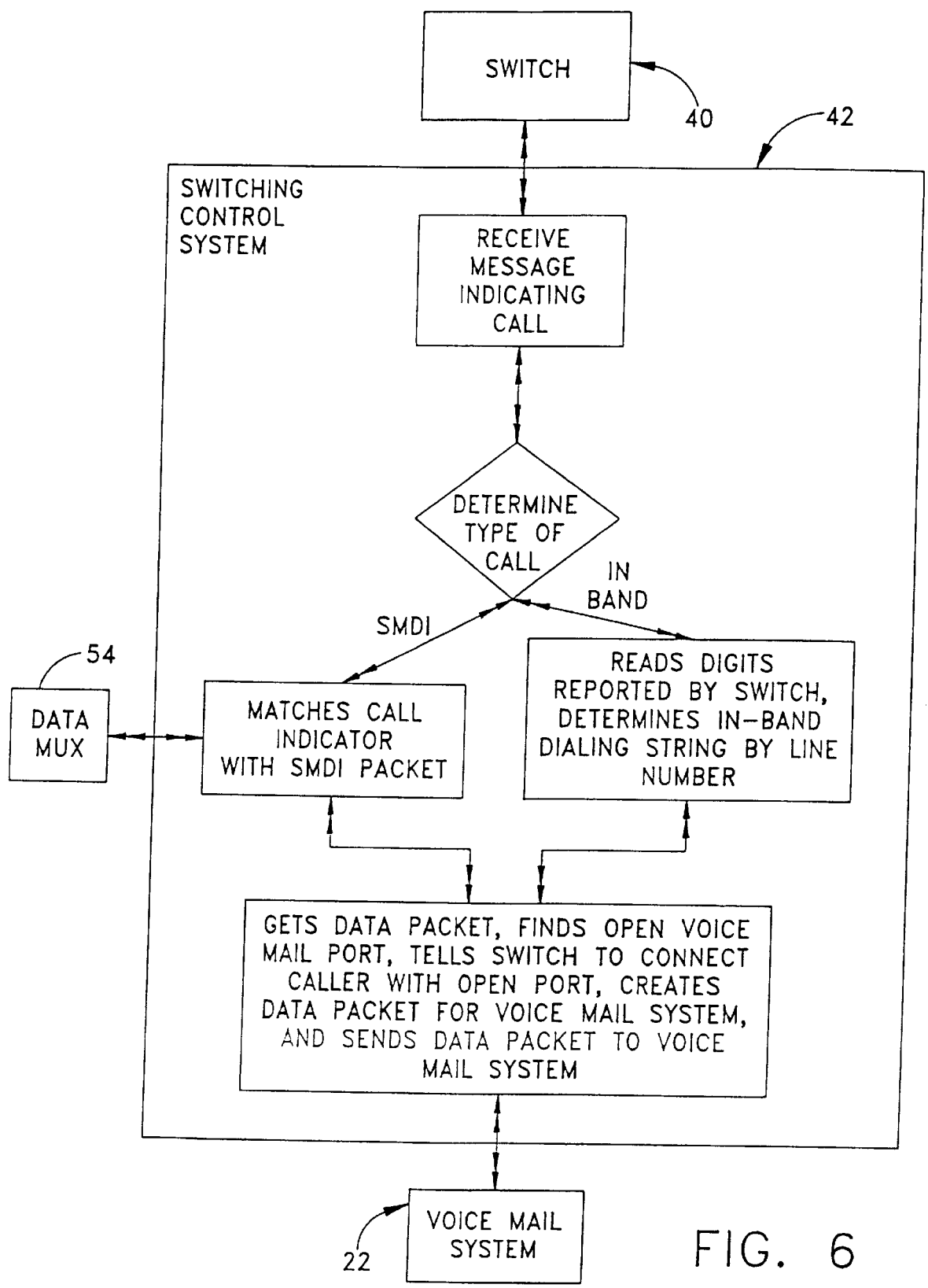
FIG. 6 is a flow diagram of how the switching control system receives and processes data, and routes calls through the integrated switch.

Referring to FIGS. 5 and 6, in general operation of the apparatus 12, the switch 40 receives an incoming call from one of the voice mail extensions VME's connected to one of the input ports 44, while an associated set of call information is provided to the switching control system 42. If the call is from an out-of-band PBX, an associated set of call information is also received by the data mux 54 and sent to the switching control system 42. If the call is from an in-band PBX, the switch 40 collects the in-band DTMF digits and reports the call information to the switching control system 42. The switching control system 42 then searches for the next available voice mail port 46 and creates a new SMDI data packet which substitutes for the original set of call information. The new data packet has the new available voice mail port information as well as the original call information. If no call information is provided, the switching control system 42 substitutes a default set of call information based on which input port 44 the call is received from. In other words, the switching control system 42 recognizes which PBX the call cam from by which input port 44 receives the call, and the switching control system is able to provide information specific to that PBX. The switching control system 42 then send the new data packet to the voice mail system 22 and cross-connects the incoming call to the allocated voice mail port 46. The voice mail system 22 then plays the appropriate greeting, records a message and disconnects.

One of the key aspects to operation of the present apparatus 10 is that the voice mail ports, i.e. output ports 46 are dynamically allocated so that the voice mail system 22 does not need to have a one-to-one correspondence with the voice mail extensions VME's. In other words, each voice mail port is selected in a rotating sequence during operation, rather than having a priority order of preference. Any incoming input port 44 can be cross-connected at any given time to any voice mail port 46 for complete dynamic port allocation of the voice mail system 22. By dynamically allocating the voice mail ports, the number of voice mail ports can be reduced to about half the number of incoming voice mail extensions (VME's). This is a dramatic reduction in the number of voice mail ports over the one-to-one allocation system used in the prior art systems, and substantially reduces the overall cost of purchase and maintenance of the voice mail system 22 during operation. It is further noted that if all of the voice mail ports are ever busy, the switching control system 42 automatically places incoming calls in a queue for handling in the order received.

The apparatus 12 also has the ability to handle Message Waiting Indicators (MWI) produced by the voice mail system 22. After disconnecting from a call, the voice mail system 22 will produce an SMDI information packet to send back to the switching control system 42 to turn on the MWI on the proper PBX to indicate that a particular extension has received a message. When the PBX is an out-of-band PBX, the MWI data packet is routed back through the switching control system 42 to the data mux 54 to the appropriate PBX which recognizes the data packet and turns on the MWI. When the PBX is an in-band PBX, the switching control system 42 selects a specific predetermined port connected to the proper PBX, picks up the port (goes off hook) and plays selected DTMF tones to the PBX which the in-band PBX interprets to mean to turn on the MWI for the called extension. Similar functions turn the MWI off when messages are retrieved. By utilizing an internal database, the switching control system 42 has the capability of handling multiple different DTMF formats at the same time which may be necessary for different in-band PBX's.

Access to the voice mail system 22 by users is achieved in the exact same manner as if the voice mail system were dedicated to a single PBX. For example, a user on PBX 18 can simply directly dial the lead voice mail extension on the local switch to access the voice mail system 22. The lead voice mail extension is the digital telephone extension 30 of the PBX. The user may then enter the necessary commands to retrieve messages, and or leave messages for other extensions within the voice mail system 22 as if the PBX were directly connected to the voice mail system 22. In this regard, the switching control system 42 is able to distinguish between the different PBX's by a database, and it has the ability to deal with conflicting extension numbering arrangement by means of pre-number identifiers provided by, for example, the integration devices. For example, in out-of-band integration, the VoiceBridge integration device 32 can be programmed to provide a three digit pre-number identifier so that the apparatus 12 can identify which PBX the call is coming from, and so that it can distinguish between an extension number 101 at one location and another extension 101 at a different location.

Figure 7:
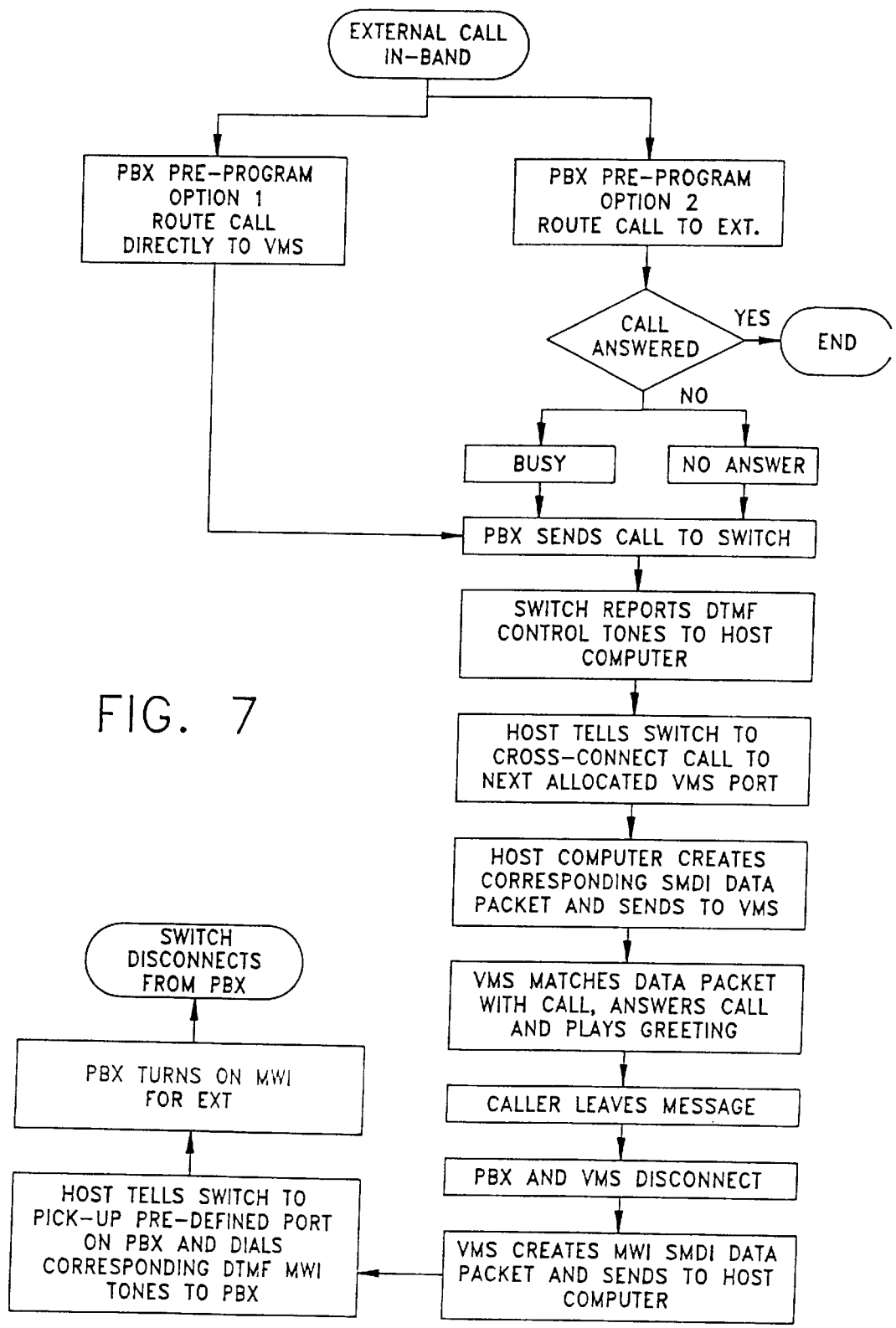
FIG. 7 is a flow diagram showing how the instant telephone switching apparatus handles an external call on an out-of-band telephone branch exchange.

Referring to FIGS. 4, 5 and 7, a specific example of the handling of an external call to in-band PBX 16 will be described. A caller calls a company wherein PBX 16 receives the call over trunk line 16T (FIG. 4) and the caller enters the extension number of the person being called, for example Ext 100. According to a pre-programmed command entered by the person being called, the PBX can either forward the call to Ext. 100 or it can immediately forward the call to the lead voice mail extension, for example Ext. 400. If the call is forwarded to the extension (Ext. 100), and is answered, the process is ended before reaching the apparatus 12. If the extension (Ext. 100) is busy or there is no answer, the PBX automatically forwards the call to the lead voice mail extension, for example Ext 400. In either scenario, when the call is forwarded to the lead voice mail extension (400), the PBX attaches to the call a series of DTMF control tones which identify the extension called,. and may also indicate the status of the call, i.e. direct forward, busy, ring no answer. The call is sent out through the remote voice over data multiplexor 50 through a private or public telephone network and into one of several local voice over data multiplexors 50 within the apparatus 12. The call is then sent to one of the input ports 44. Meanwhile, the switching control system 42 reads to DTMF control tones, determines the next available voice mail port 46, and creates an SMDI data packet which it substitutes for the DTMF tones. The SMDI data packet is sent to the voice mail system 22, the call is cross-connected to the allocated voice mail port 46, and the voice mail system 22 answers the call with the appropriate greeting. The caller then leaves message, and PBX 16 and voice mail system 22 disconnect. Thereafter, to light the MWI back on PBX 16, the voice mail system 22 sends an SMDI packet back to the switching control system 42. By means of an internal database, the switching control system 42 knows that PBX 16 is an in-band PBX, and therefore knows that it must pick up the predetermined MWI port and play DTMF tones to light the MWI.

Figure 8:
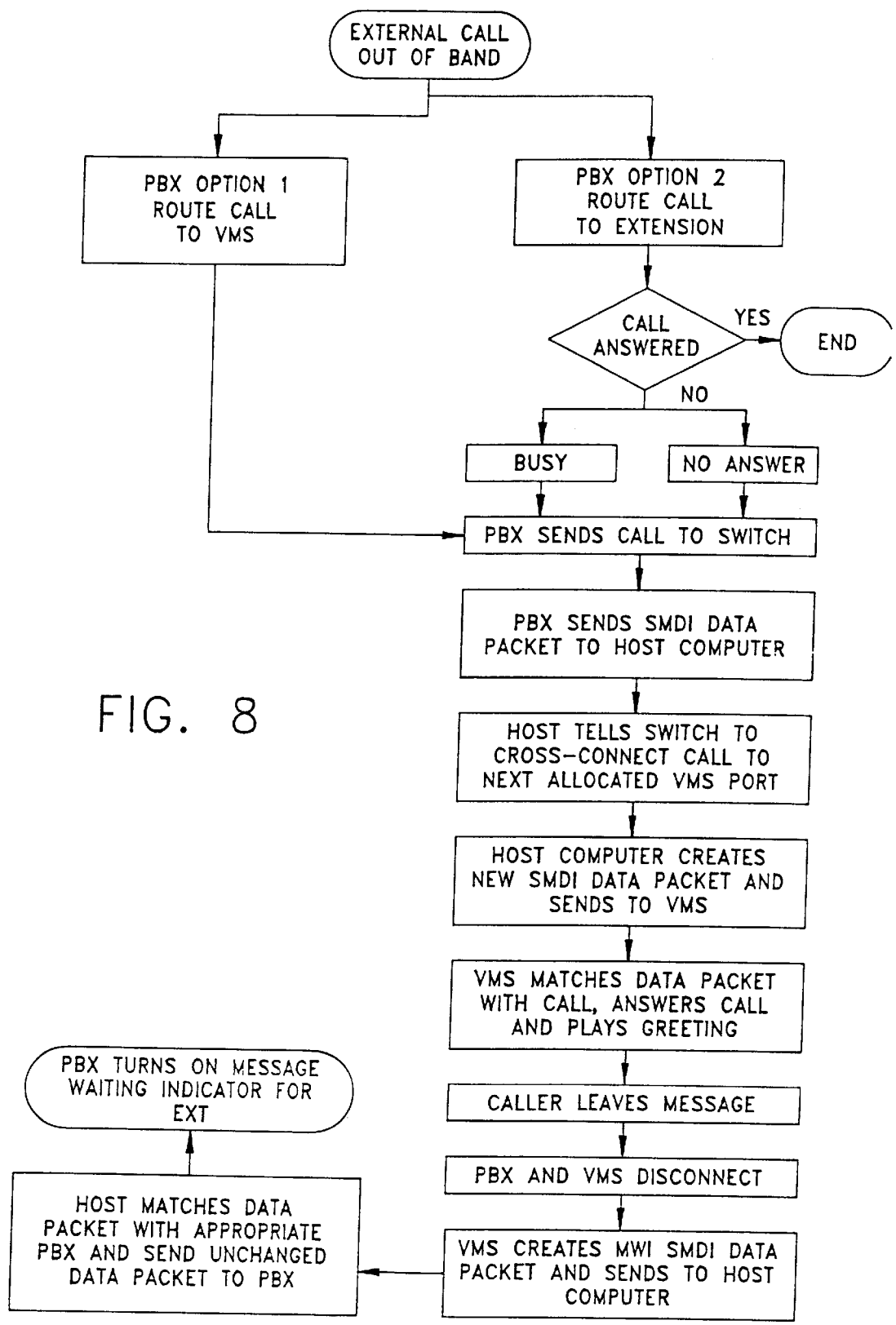
FIG. 8 is a flow diagram of showing how the instant telephone switching apparatus handles an external call on an in-band telephone branch exchange.

Referring to FIGS. 3, 5 and 8, a specific example of the handling of an external call to out-of-band PBX 20 will be described. A caller calls a company wherein PBX 20 receives the call over trunk line 20T (FIG. 3) and the caller enters the extension number of the person being called, for example Ext 123. According to a pre-programmed command entered by the person being called, PBX 20 can either forward the call to Ext. 123 or it can immediately forward the call to the lead voice mail extension, for example Ext. 500. If the call is forwarded to Extension 123, and the call is answered, the process is ended before reaching the apparatus 12. If the Extension 123 is busy or there is no answer, PBX 20 automatically forwards the call to the lead voice mail extension, for example Ext 500. In either scenario, when the call is forwarded to the lead voice mail extension (500), the integration device 32 extracts call information from PBX 20 which identifies the extension called, and indicates the status of the call, i.e. direct forward, busy, ring no answer, and creates an SMDI data packet to send to the switching control system. The call is then sent out through the remote multiplexor 50 along with the data packet through a private or public telephone network and into one of several local multiplexors 50 within the apparatus 12. The call itself is then sent to one of the input ports 44 while the data packet is sent to the switching control system 42. The switching control system 42 reads the data packet, matches the packet with the call, determines the next available voice mail port 46, and creates a new SMDI data packet which it substitutes for the original packet. The new SMDI data packet is sent to the voice mail system 22, the call is cross-connected to the allocated voice mail port 46, and the voice mail system 22 answers the call with the appropriate greeting. The caller then leaves message, and PBX 20 and voice mail system 22 disconnect. Thereafter, to light the MWI back on PBX 20, the voice mail system 22 sends an SMDI packet back to the switching control system 42. By means of same internal database, the switching control system 42 knows that PBX 20 is an out-of-band PBX, and therefore knows that it can send the SMDI packet back through the data mux 54 to the PBX.

Figure 9:
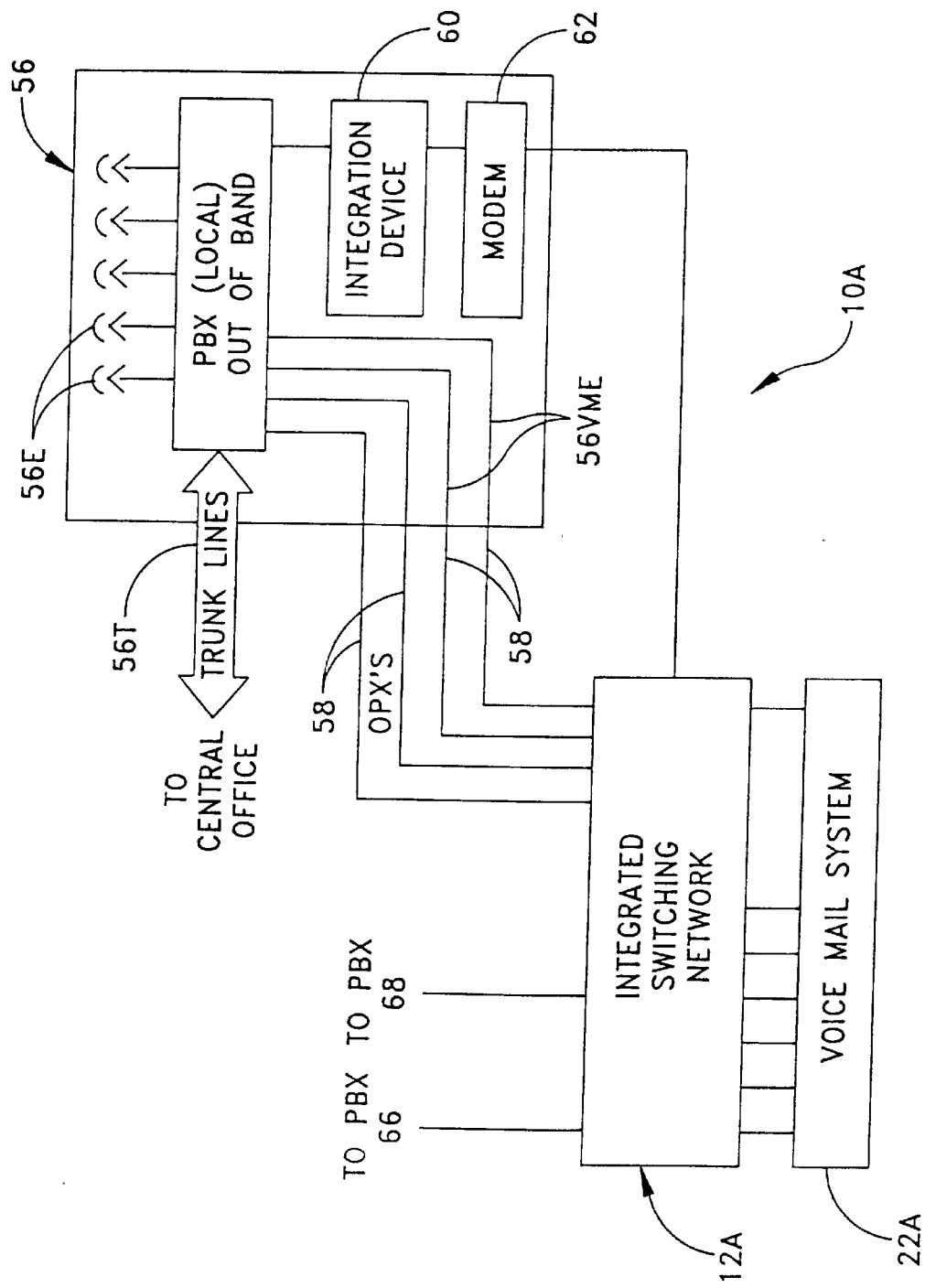
FIG. 9 is a schematic block diagram of another embodiment of an integrated telephone system utilizing off premise extension (OPX) lines and incorporating the switching apparatus of the instant invention.
Figure 10:
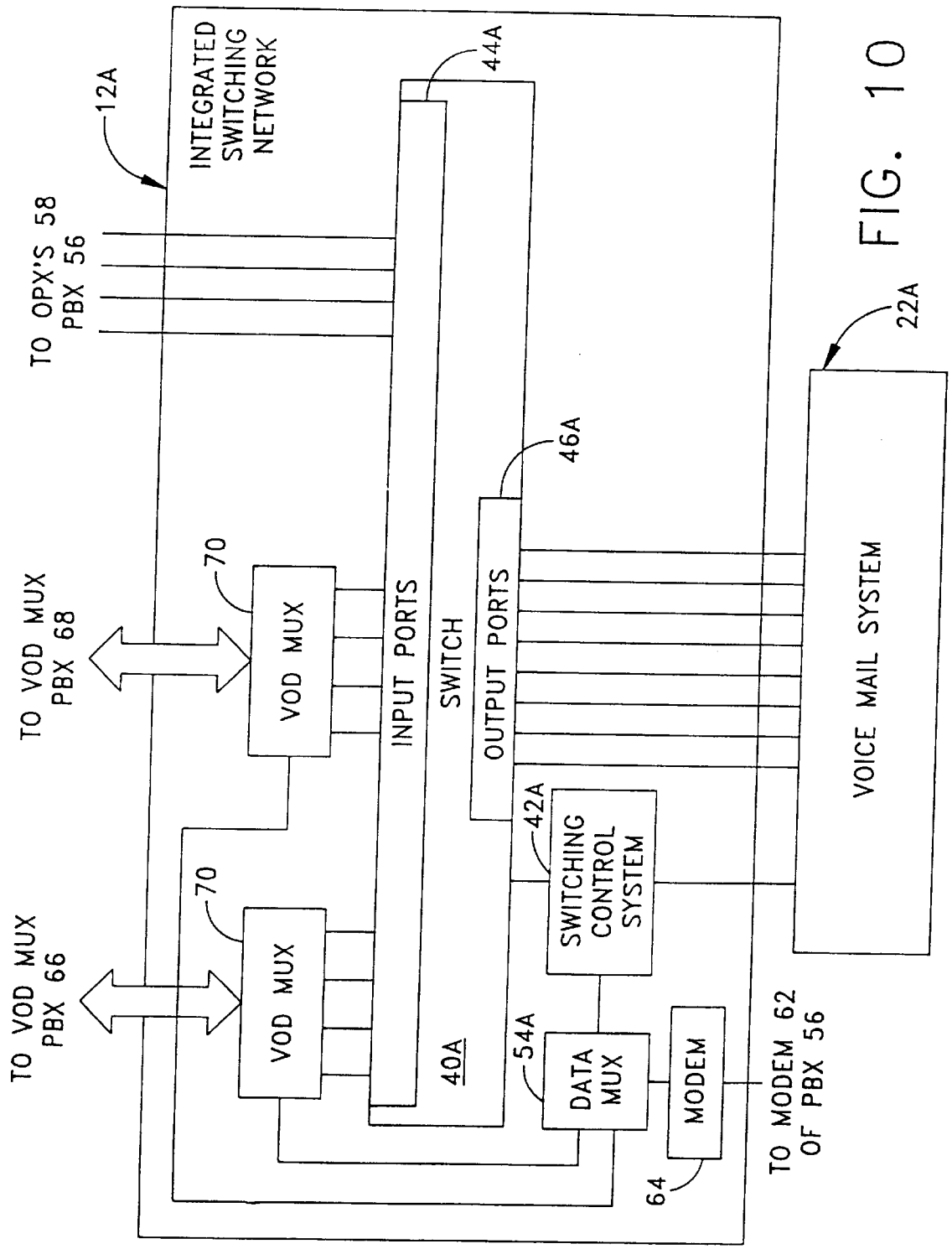
FIG. 10 is an enlarged block diagram of the integrated switching apparatus as illustrated in FIG. 9.

Referring now to FIGS. 9 and 10, an alternate embodiment of a telephone system is illustrated and generally indicated at 10A. The system 10A is illustrated to demonstrate the connection of a local off-premise PBX generally indicated at 56, and the use of off-premise extension lines 58 to connect the voice mail extensions to the switching network 12A. The PBX 56 is generally similar to PBX 20 (FIG. 3) including a trunk station for trunk lines 56T, a first telephone extension station for telephone extensions 56E, a second telephone extension station for voice mail extensions 56VME, and a digital telephone extension. The key difference in this system 10A is that the voice mail extensions 56VME are connected directly to the switch 40A by means of off-premise extension lines 58. Call information from the digital telephone extension is sent to the data mux 54A through an integration device 60, a remote modem 62 and a local modem 64 within the apparatus 12A. The system 10A functions in the same manner as system 10 except for the telephone connections to the switch 40A and data mux 54A. Other lines connected to the apparatus 12A may come in from other remote PBX's 66, 68 (not shown) through conventional voice over data. multiplexors 70, 72.

It is also noted that OPX lines can also be utilized to integrate either local or remote in-band PBX's with the apparatus 12, and for that matter, OPX lines can generally be substituted for any connection between the PBX and the apparatus 12.

It can therefore be seen that the instant integrated switching apparatus 12 provides an effective mechanism for interconnecting multiple PBX's 14, 16, 18 and 20 to a single voice mail system 22. The integrated switching apparatus takes all the incoming calls from the multiple PBX's, and dynamically directs the calls to the voice mail system with full integration of all call information and services, including messages, message waiting indicators, automated attendant, and transfer to live operators. The apparatus provides the unique ability and the attendant advantages of having a single voice mail system for multiple telephone systems. Accordingly, there is no longer any need to install and maintain multiple, redundantly oversized, voice mail systems at multiple locations. Huge savings in initial equipment costs and further savings in administrative operating costs are achieved while enhancing functionality instead of compromising functionality. Furthermore, the fact that every branch exchange is connected to the same voice mail system eliminates toll calling between separate voice mail systems to exchange messages while also providing instantaneous access to voice mail messages no matter where the voice message originated. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. Apparatus for providing call information integration and call switching from a plurality of different PBX's to a single voice mail system, said apparatus comprising:

a switching apparatus including a plurality of input ports connected to voice mail extensions on each of a plurality of different PBX's, a plurality of output ports connected to a plurality of voice mail ports of a single voice mail system, and a switching circuit interconnecting the input ports to the output ports for selectively cross-connecting calls from said input ports to said output ports; and a switching control apparatus coupled to said switching apparatus for selectively controlling cross-connecting of said calls from said input ports to said output ports, said switching control apparatus including means for communicating with each of said PBX's for exchanging call information between said PBX's and said switching control apparatus, means for communicating with said voice mail system for exchanging call information between said switching control apparatus and said voice mail system, database means for storing input port assignments identifying each of said voice mail extensions of each of said plurality of PBX's, communication protocols for defining communication between said switching control apparatus and each of said plurality of PBX's, and a communication protocol for communicating with said voice mail system, and means for generating a new set of call information for each call to be cross-connected to said voice mail system, said switching control apparatus being operative for receiving a set of call information from a respective one of said PBX's, said set of call information being associated with a call forwarded from said respective PBX on said voice mail extension and received on one of said input ports, said set of call information at least identifying the called party and the respective voice mail extension to which the call has been forwarded, said switching control apparatus further being operative for determining an available voice mail port, creating a new set of call information at least identifying the called party and the respective voice mail port to which the call is being forwarded, communicating said new set of call information to said voice mail system to identify said call to said voice mail system, and cross-connecting said call from said input port to said available output port.

2. The apparatus of claim 1 wherein the number of input ports in said switching apparatus is greater than the number of output ports.

3. The apparatus of claim 2 wherein said number of input ports is at least 1.5 times the number of output ports.

4. The apparatus of claim 2 wherein said output ports are dynamically allocated in rotating order.

5. The apparatus of claim 3 wherein said output ports are dynamically allocated in rotating order.

6. The apparatus of claim 1 wherein said switching control apparatus further includes means for receiving message waiting call information from said voice mail system, database means for identifying the receiving PBX and called party, means for generating a new set of message waiting call information identifying the receiving PBX and called party, and means for communicating said message waiting call information to said receiving PBX.

7. An integrated telephone and voice mail network comprising:

a first PBX having a trunk-side connection with a central office, and a plurality of station-side voice mail extensions, said first PBX including means for a providing and receiving call information associated with calls forwarded to said voice mail extensions;

a second PBX having a trunk-side connection with a central office, and a plurality of station-side voice mail extensions, said second PBX including means for providing and receiving call information associated with calls forwarded to said voice mail extensions;

a single voice mail system including a plurality of voice mail ports for receiving forwarded calls, said voice mail system including means for receiving and providing call information associated with incoming calls; and apparatus for providing call information integration and call switching from said first and second PBX's to said single voice mail system, said apparatus comprising a switching apparatus including a plurality of input ports connected to said plurality of said voice mail extensions of said first and second PBX's, a plurality of output ports coupled to said plurality of voice ports of said single voice mail system, and a switching circuit interconnecting the input ports to the output ports for selectively cross-connecting calls from said input ports to said output ports, said apparatus for providing further comprising a switching control apparatus coupled to said switching apparatus for selectively controlling cross-connecting of said calls from said input ports to said output ports, said switching control apparatus including means for communicating with said first and second PBX's for exchanging call information between said PBX's and said switching control apparatus, means for communicating with said voice mail system for exchanging call information between said switching control apparatus and said voice mail system, database means for storing input port assignments identifying each of said voice mail extensions of said first and second PBX's, communication protocols for defining communication between said switching control apparatus and said first and second PBX's, and a communication protocol for communicating with said voice mail system, and means for generating a new set of call information for each call to be cross-connected to said voice mail system, said switching control apparatus being operative for receiving a set of call information from a respective one of said first and second PBX's, said set of call information being associated with a call forwarded from said respective one of said first and second PBX's on a respective voice mail extension and received on one of said input ports, said set of call information at least identifying the called party and the respective voice mail extension to which the call has been forwarded, said switching control apparatus further being operative for determining an available voice mail port, creating a new set of call information at least identifying the called party and the respective voice mail port to which the call is being forwarded, communicating said new set of call information to said voice mail system to identify said call to said voice mail system, and cross-connecting said call from said input port to said available output port.

8. The integrated telephone and voice mail network of claim 7 wherein the number of input ports in said switching apparatus is greater than the number of output ports.

9. The integrated telephone and voice mail network of claim 8 wherein said number of input ports is at least 1.5 times the number of output ports.

10. The integrated telephone and voice mail network of claim 8 wherein said output ports are dynamically allocated in rotating order.

11. The integrated telephone and voice mail network of claim 9 wherein said output ports are dynamically allocated in rotating order.

12. The integrated telephone and voice mail network of claim 7 wherein said first PBX comprises an in-band PBX, said first PBX means for a providing and receiving call information comprising means for generating and interpreting DTMF dial tones.

13. The integrated telephone and voice mail network of claim 7 wherein said first PBX comprises an out-of-band PBX, said first PBX means for a providing and receiving call information means comprising an integration device capable of generating and interpreting SMDI information packets.

14. The integrated telephone and voice mail network of claim 12, wherein said second PBX comprises an out-of-band PBX, said second PBX means for a providing and receiving call information means comprising an integration device capable of generating and interpreting SMDI information packets.

15. A method of providing integrated call information and call switching from a plurality of different PBX's to a single voice mail system utilizing an integration apparatus including a switching apparatus including a plurality of input ports connected to voice mail extensions on each of a plurality of different PBX's, a plurality of output ports connected to a plurality of voice mail ports of a single voice mail system, and a switching circuit interconnecting the input ports to the output ports for selectively cross-connecting calls from said input ports to said output ports, said integration apparatus further including a switching control apparatus coupled to said switching apparatus for selectively controlling cross-connecting of said calls from said input ports to said output ports, said switching control apparatus including means for communicating with each of said PBX's for exchanging call information between said PBX's and said switching control apparatus, means for communicating with said voice mail system for exchanging call information between said switching control apparatus and said voice mail system, database means for storing input port assignments identifying each of said voice mail extensions of each of said plurality of PBX's, communication protocols for defining communication between said switching control apparatus and each of said plurality of PBX's, and a communication protocol for communicating with said voice mail system, and means for generating a new set of call information for each call cross-connected to said voice mail system, said method comprising the steps of:

receiving a call on one of said PBX's;

communicating a set of call information from said PBX to said switching control apparatus, said set of call information identifying at least the called party and a respective PBX voice mail extension to which the call is being forwarded;

determining which PBX said call originated from;

interpreting the set of call information;

determining an available voice mail port;

creating a new set of call information for said call, said new set of call information identifying at least the called party by PBX and called party extension, and further identifying a respective voice mail port to which the call is being cross-connected;

communicating said new set of call information to said voice mail system to identify said call to said voice mail system;

cross-connecting said call from said input port to said available output port;

providing a personalized greeting associated with said called party; and receiving a voice mail message from the calling party.

16. The method of claim 15 wherein said call information is communicated in SMDI data packet format.

17. The method of claim 15 wherein said call information is communicated in DTMF format.

18. The method of claim 15 wherein a first of said PBX's comprises an in-band PBX which communicates call information in DTMF format, and a second of said PBX's comprises an out-of-band PBX which communicates call information in SMDI data packet format.

19. The method of claim 15 further comprising the steps of activating a message waiting indicator (MWI) on the called party extension.

20. The method of claim 19 further comprising the steps of:

communicating MWI call information from said voice mail system to said integration apparatus;

determining by means of said database in said integration apparatus the respective PBX to receive said MWI call information; and communicating said MWI call information from said integration apparatus to said receiving PBX.

21. The method of claim 20 wherein said receiving PBX is an out-of-band PBX, said step of communicating said MWI call information comprising the steps of forwarding said MWI call information directly to said receiving PBX.

22. The method of claim 20 wherein said receiving PBX is an in-band PBX, said step of communicating said MWI call information from said integration apparatus to said PBX comprising said switching control apparatus going "off-hook" on a predefined voice mail extension on said determined PBX and dialing corresponding DTMF MWI tones to said PBX.

* * * * *